INVENTOR.
R. GLEN MADSEN
BY White & Haefliger
ATTORNEYS.

INVENTOR.
R. GLEN MADSEN
By White & Haefliger
ATTORNEYS.

INVENTOR.
R. GLEN MADSEN
BY White & Haefliger
ATTORNEYS.

INVENTOR.
R. GLEN MADSEN
BY White & Haefliger
ATTORNEYS.

United States Patent Office 3,469,198
Patented Sept. 23, 1969

3,469,198
PHASE DETECTOR FOR PHASE LOCKED LOOP FREQUENCY DETECTOR EMPLOYING CURRENT SWITCHING APPARATUS

R. Glen Madsen, Newport Beach, Calif., assignor to Astrodata, Inc., Anaheim, Calif., a corporation of California Filed Dec. 20, 1965, Ser. No. 514,839
Int. Cl. H03d 3/18
U.S. Cl. 329—50 9 Claims

ABSTRACT OF THE DISCLOSURE

The disclosure concerns a phase detector for use in a phase locked loop frequency detector, and characterized by phase sampling apparatus to repeatedly and quantitatively sample the phase difference between a data input signal and a loop oscillator generated signal; the loop also including a filter; and improved current switching apparatus connected to pass loop filter input current during time intervals corresponding to such sampling.

This invention relates generally to processing of phase modulated or FM signals, and more particularly concerns improvements in discriminators for deriving output signals from FM data input signals. More specifically, the invention concerns improvements in the phase detector components of phase locked loop frequency detectors.

Important objects of the invention include the provision of an improved phase detector enabling operation of a phase locked loop system with combinations and subcombinations of the following advantages: minimal fundamental double frequency ripple on the DC output of the detector under dynamic conditions; the provision for phase detector average output current or voltage directly proportional to the phase difference between the two square-wave input waveforms rather than being offset 90 degrees as in a conventional phase sensitive detector; the provision for detector linear output versus of ±180°; the provision of a phase detector acting as a composite phase/frequency detector with a current/voltage output proportional to the sign of the frequency difference between data and loop oscillator inputs; the provision for minimal carrier on the loop output when used with a current mode loop filter, with zero carrier when operating in a phase locked loop with fixed input frequency, as for example is brought out in my co-pending application entitled "Loop Filter for Phase Locked Loop Frequency Detector" Ser. No. 514,480, filed Dec. 17, 1965, now U.S. Patent 3,375,463; application of the phase detector as a frequency to voltage converter in a phase locked loop subcarrier discriminator; and application of the phase detector as a frequency to frequency converter in a frequency domain tape speed compensation system as described in William F. Gunning et al. application for U.S. Letters Patent entitled "Record Speed Compensation for Systems for Processing Recorded Information," Ser. No. 458,209, filed May 24, 1965, the frequency to frequency transfer function having no "zero" term in the numerator.

These and other objects and advantages of the invention, as well as the details of illustrative embodiments, will be more fully understood from the following detailed description of the drawings, in which.

Figure 1:
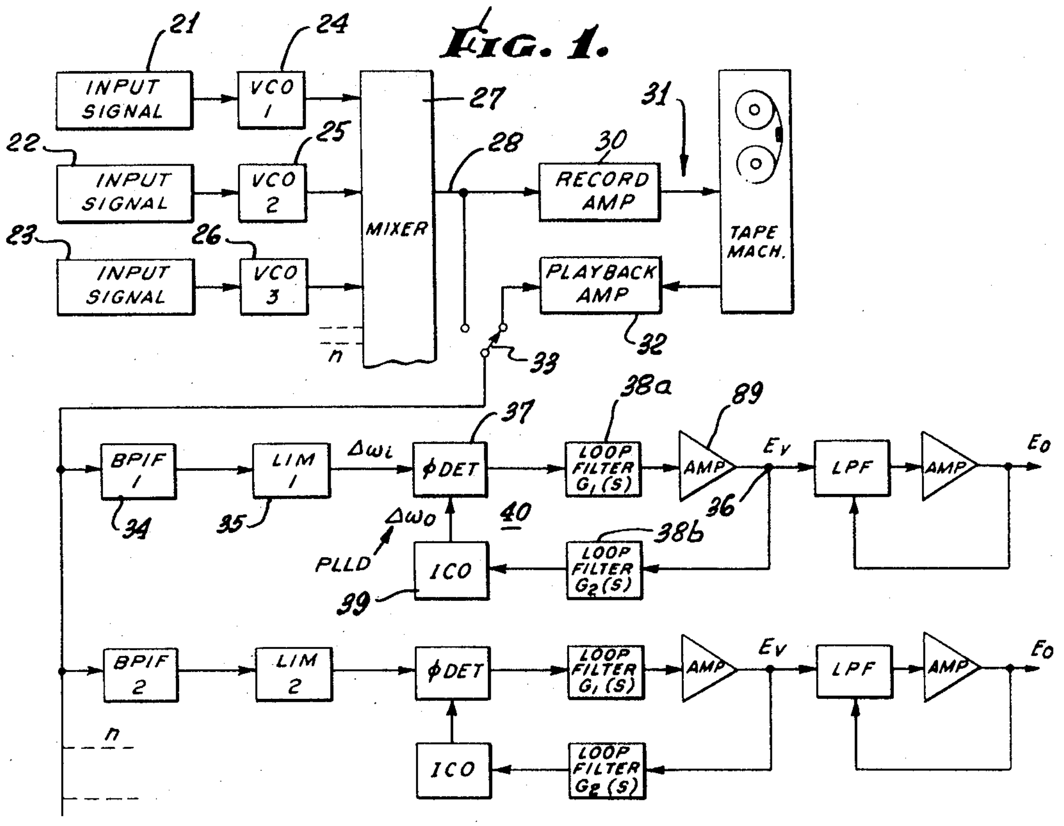
FIG. 1 is a block diagram of an FM telemetry system.

Referring now specifically to FIG. 1, there is shown a system for handling recorded information signals such as might be obtained in a standard FM–FM telemetry system wherein a carrier signal is frequency-modulated by a plurality of frequency-modulated subcarriers. Signal sources 21–23 generate DC or AC information signals which respectively modulate the output frequencies of subcarrier oscillators 24–26 about their center values. To simplify the drawing, only three channels are represented in FIG. 1. It will be understood that in practice N (say eighteen standard Inter Range Instrumentation Group) channels may be simultaneously employed.

The frequecy modulated subcarriers are then mixed at 27 for subsequent transmission indicated at 28. After transmission, the composite subcarrier signal may be recorded on a suitable recording medium, such as magnetic tape, by recorder 31, after transmission via record amplifier 30. The recorded composite subcarrier signal is subsequently reproduced through playback amplifier unit 32 whose output is supplied to N parallel-connected channel discriminators corresponding to the number of subcarrier signals. As diagrammatically indicated by the double throw switch 33, the composite subcarrier signal may be directly applied to the N discriminators without first being recorded.

Each discriminator includes a band-pass input filter (BPIF) 34 which serves to extract from the composite subcarrier signal the particular channel's frequency spectrum to be demodulated. BPIF 34 may be either active or passive and should possess a constant time delay and a substantially smooth frequency response across its passband of interest and provide maximum rejection outside its band edges. Filters 34, suitably, may comprise a number of stagger tuned resonant inductor-capacitor combinations isolated from each other by buffer amplifier stages.

The output signal of BPIF 34 may first be converted into a square wave of substantially constant amplitude by a limiter 35. The output of each limiter 35 is then applied to a phase-locked loop detector (PLLD), each detector including at least three fundamental networks; a phase detector (PSD) 37, a loop filter 38*a* and a voltage or current controlled oscillator (VCO or ICO) 39, all cascaded around a loop 40.

The function of the phase detector is to sample the difference in phase of the output signal $\omega_o$ of the VCO relative to the phase of the received subcarrier signal $\omega_i$ appearing at the output of limiter 35 and to produce current or voltage indicative of that phase difference.

The output signal from the PSD is applied to the loop filter 38*a*, whose function is to establish the dynamic conditions necessary for loop tracking. The DC component $E_v$ of the loop filter output, appearing at junction 36 (after amplification at 89) is applied to the loop filter 38*b* to modulate the frequency of the oscillator 39 about its base value. The modulation is such as to bring the frequency of the oscillator's output signal to the same frequency as that of the subcarrier signal. The change in the oscillator's frequency is of such magnitude and direction as to seek to eliminate the phase error $\phi_e$, originally responsible for the creation of the DC component at the output of the PSD 37.

Figure 3:
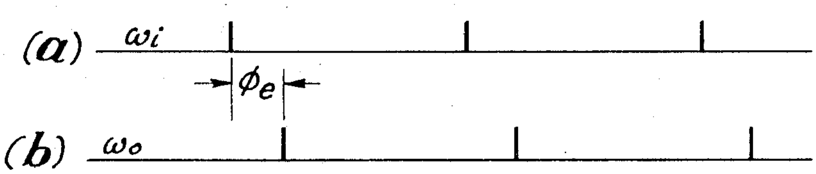
FIG. 3 shows waveforms.

The invention principally has to do with an improved phase detector that basically comprises phase sampling apparatus to repeatedly and quantitatively sample the phase difference between a data input signal and an oscillator generated signal, and current switching apparatus connected to pass loop filter input current during time intervals corresponding to such sampling. In this regard, FIGS. 3*a* and 3*b* show the data subcarrier input signal $\omega_i$ to the phase detector 37 leading the output signal $\omega_o$ of the oscillator or VCO 39, with phase error $\phi_e$ being indicated. Typically, the current switching apparatus passes positive loop filter input current during phase error intervals corresponding to $\omega_i$ lagging $\omega_o$, and the current switching apparatus passes negative loop filter input current during phase error intervals corresponding to $\omega_i$ leading $\omega_o$.

Figure 2:
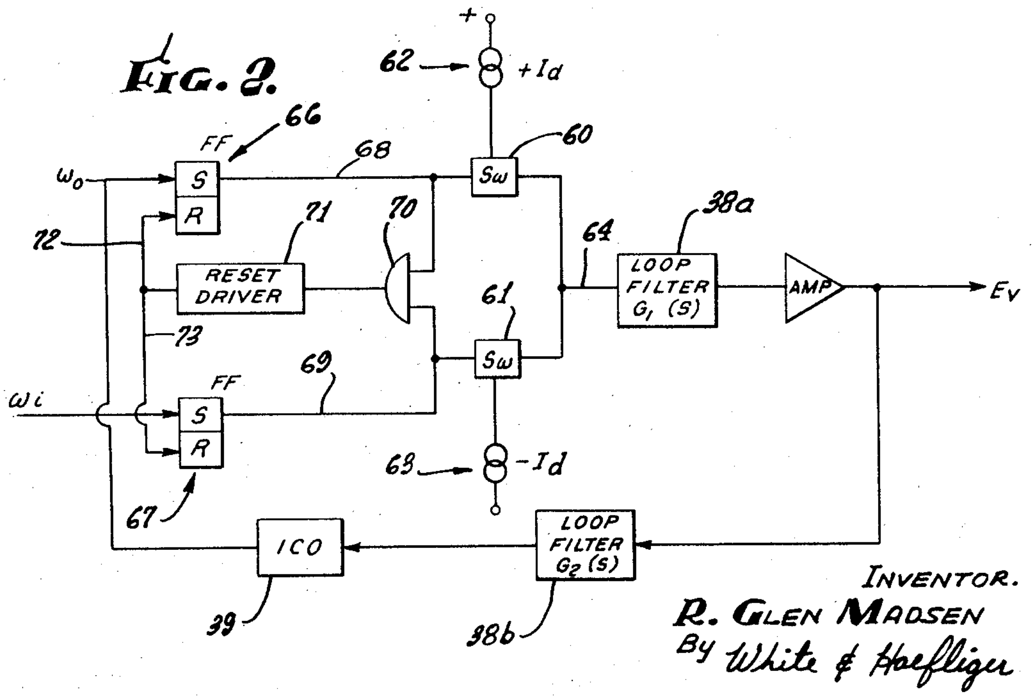
FIG. 2 is a circuit diagram showing the phase detector in a phase locked loop system.

In that form of the detector 37 illustrated in FIG. 2, the current switches are shown at 60 and 61, with positive and negative current generators indicated at 62 and 63. The outputs from the switches are passed at 64 to the loop filter integrating means, as for example a capacitor when using a current mode loop filter as described in my co-pending application entitled "Loop Filter for Phase Locked Loop Frequency Detector."

The phase sampling apparatus typically includes bistable devices, such as flip-flops 66 and 67, each having dual states. Flip-flop 66 is connected at 68 to cause one switch 60 to pass positive current $I_d$ to the loop filter input when flip-flop 66 is in set state, and flip-flop 67 is connected at 69 to cause the other switch 61 to pass negative current $-I_d$ to the loop filter input when flip-flop 67 is in set state. Flip-flop 66 is set in response to reception of a VCO signal $\omega_o$ (axis crossing) and remains set until flip-flop 67 receives a data input signal $\omega_i$ (axis crossing), at which time it is reset to cut-off switch 60. Conversely, flip-flop 67 is set in response to reception of a data input signal $\omega_i$ (axis crossing) and remains set until flip-flop 66 receives a VCO signal $\omega_o$ (axis crossing) at which time it is reset to cut-off switch 61.

The means to cause the flip-flops to reset may typically and advantageously include an AND gate 70 having inputs connections to 68 and 69, and a reset driver 71 operated by the AND gate and having output connections at 72 and 73 as shown. When both flip-flops are set, AND gate 70 goes true, resetting both flip-flops via the reset driver.

During the time both flip-flops 66, 67 are on, no current is fed to the loop filter because $$|I_d|=|-I_d|$$

and the difference current is essentially zero. Consequently the Reset Driver 71 may include a small delay to allow the last flip-flop which turns on, time to stabilize before it is reset along with the other flip-flop.

Figure 4:
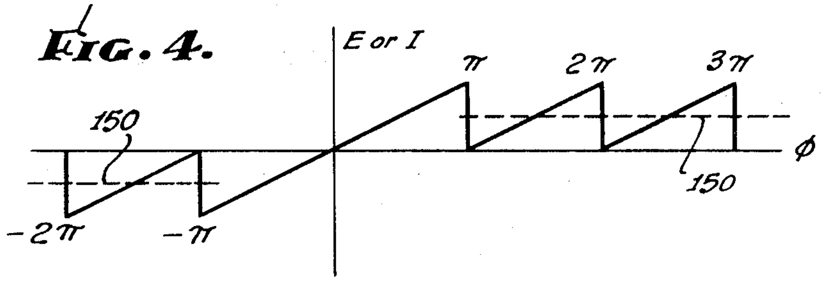
FIGS. 4, 5 and 6 show linear phase characteristics for different phase detectors.
Figure 5:
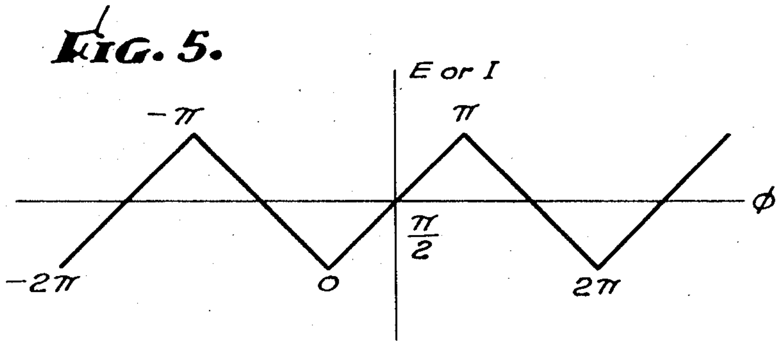

FIG. 4 shows the linear phase characteristic of the above described phase detector over the range from $-\pi$ to $+\pi$ radians, which contrasts with the linear range of $\pm 90°$ for a conventional phase detector as shown in FIG. 5.

Figure 6:
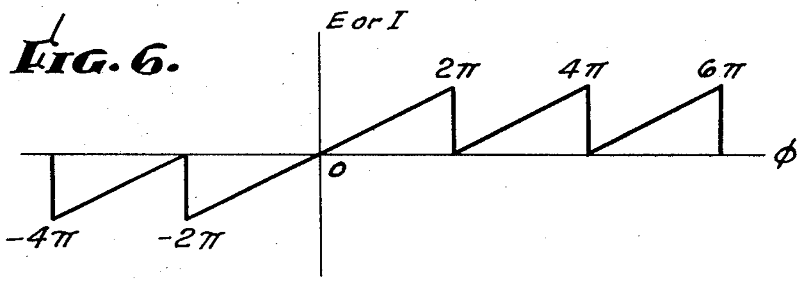

If only one axis crossing per cycle is utilized as input to the above described phase detector, the range of linear output is extended to $\pm 2\pi$ radians or $\pm 360°$, as shown in FIG. 6.

This range of linear phase response can be extended to $\pm 2^n\pi$ by adding dividers between the input signal and the phase detector and the VCO or ICO and the phase detector where the division factor is *n*.

It will be clear to those skilled in the art that combinations of phase detectors with different division ratios may be combined in a single PLL to obtain special characteristics.

FIG. 4 also shows that where there is a frequency difference between the two input signals, the phase detector produces a DC output 150 the sign of which relates to the sign of the frequency difference as shown. No such DC component exists in FIG. 5.

Figure 7:
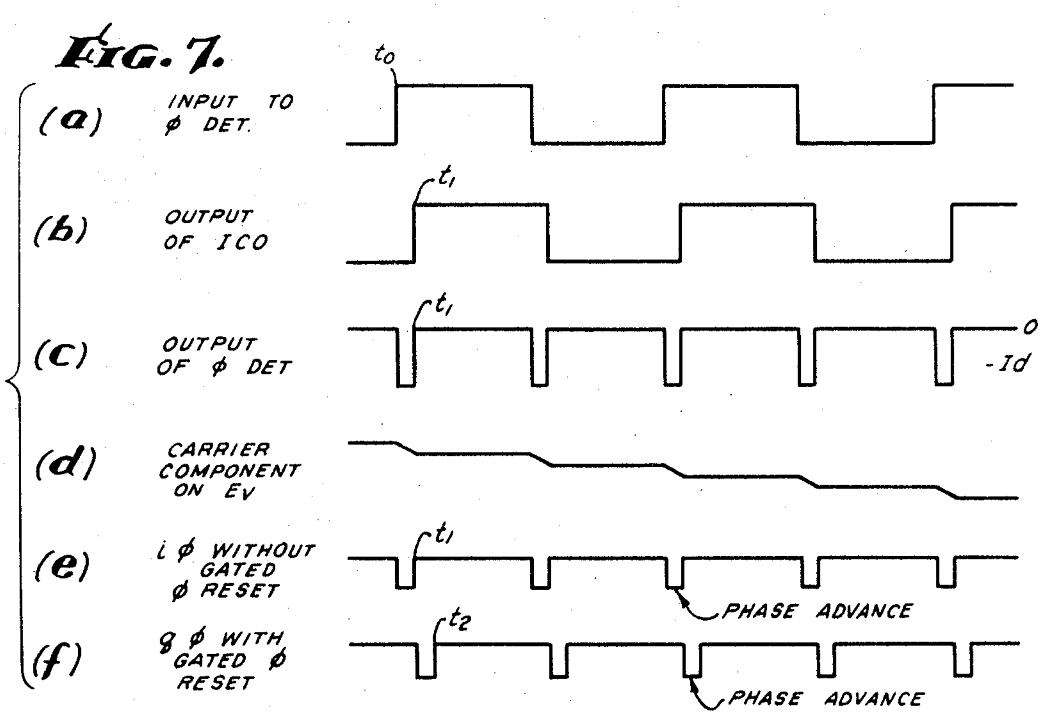
FIGS. 7 and 8 show pertinent waveforms.
Figure 8:
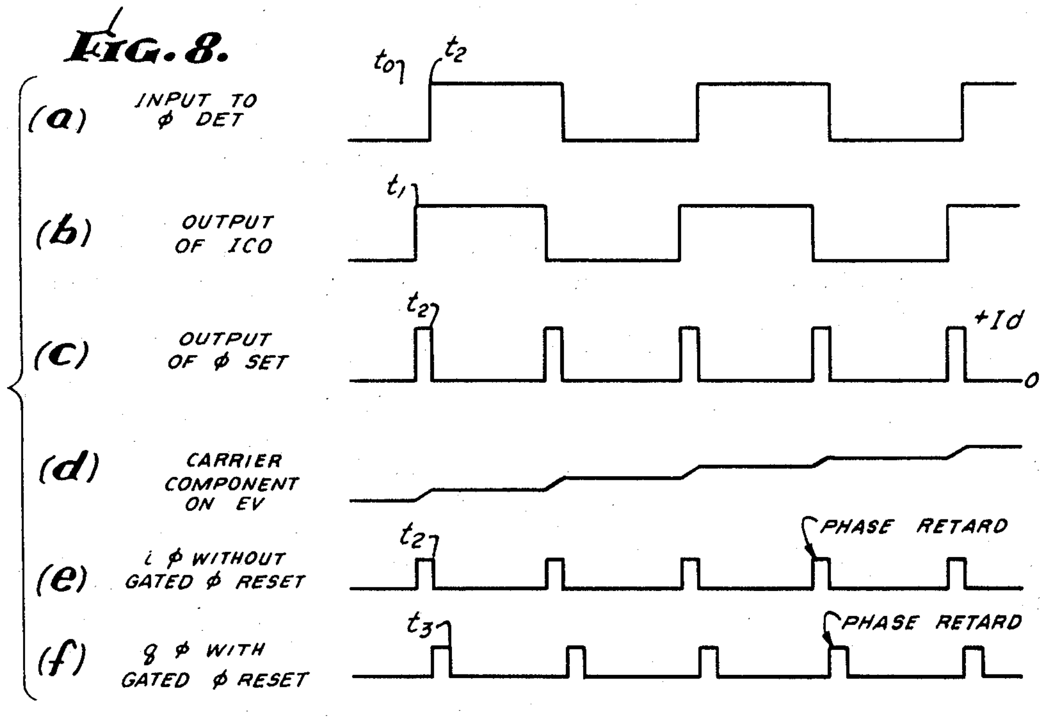

FIG. 7 shows pertinent waveforms where the data input to the above described phase detector leads the ICO output, (i.e. the input to the phase detector from the ICO), as is clear from waveform 7A and 7B. Waveform 7C shows the phase detector output; waveform 7D illustrates the carrier component on the output voltage $E_v$; and waveforms 7E and 7F respectively show the change of $i\phi$ without gated phase reset and the change of $q\phi$ with gated phase reset as more particularly described in my co-pending application entitled "Loop Filter for Phase Locked Loop Frequency Detector." FIG. 8 illustrates waveforms corresponding to those in FIG. 7, but for the case where the data input lags the ICO output.

Figure 9:
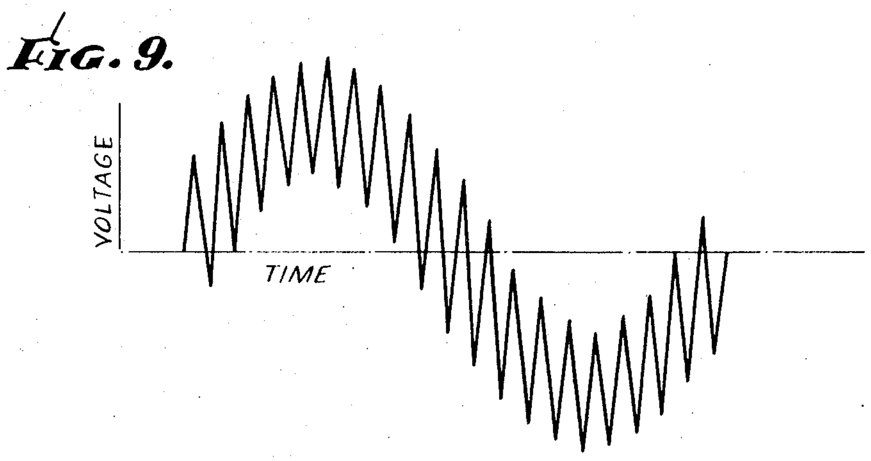
FIGS. 9, 10 and 11 show output voltages $E_v$ for different phase detector and loop filter combinations.
Figure 10:
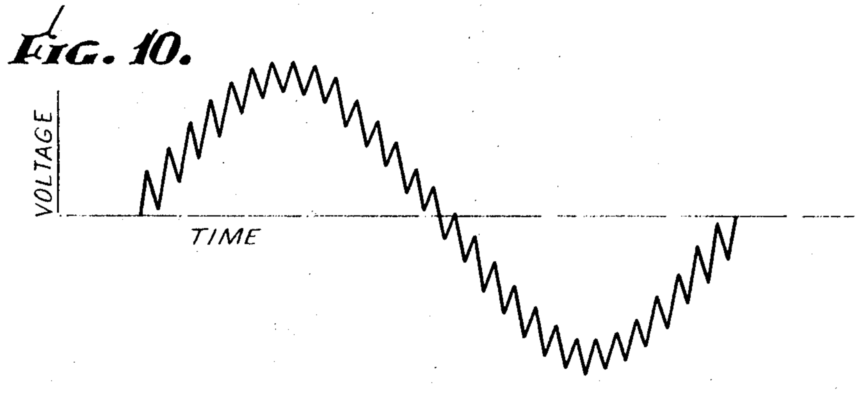
Figure 11:
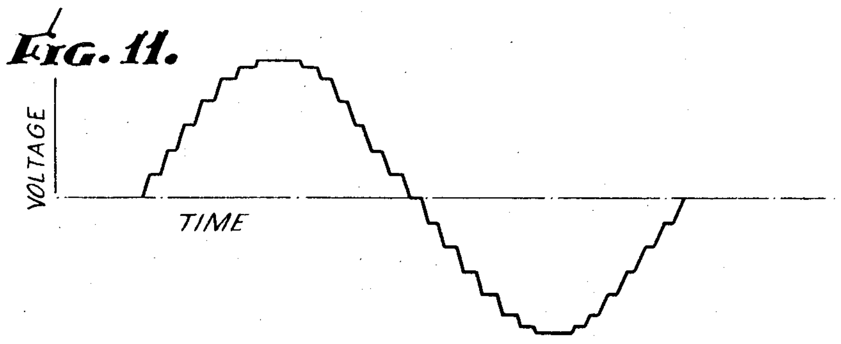

FIG. 9 shows the output voltage $E_v$ of a phase locked loop using a conventional phase detector and a conventional loop filter; FIG. 10 shows output voltage $E_v$ where the loop utilizes a conventional phase detector and a current mode loop filter as described in said co-pending application entitled "Loop Filter for Phase Locked Loop Frequency Detector"; and FIG. 11 shows the loop output voltage $E_v$ where the detector is as described above in FIG. 2, and the filter is a current mode loop filter as described in said co-pending application.

I claim:

1. For use in a phase locked loop frequency detector that includes phase detector, loop filter and tracking oscillator elements connected in a loop, the oscillator element providing an oscillator generated signal, an improved phase detector connected between the oscillator and filter and comprising phase sampling apparatus to repeatedly and quantitatively sample the phase difference between a data input signal applied to said apparatus and the oscillator generated signal, the oscillator generated signal having a frequency $\omega_o$ equal to the variable frequency $\omega_i$ of the data input signal, and error signal source and switching apparatus connected to transmit error signal input to the loop filter only during time intervals corresponding to said sampling.

2. The phase detector of claim 1 in which said switching apparatus includes error current input switches connected to pass current in one direction with respect to the loop filter only during time intervals characterized in that the oscillator generated signal leads the data input signal, and to pass current in the opposite direction with respect to the loop filter only during time intervals characterized in that the data input signal leads the oscillator generated signal.

3. The phase detector of claim 2 including said loop filter in combination therewith.

4. The combination of claim 3 in which said loop filter comprises current integrating means having input connection with the output of said current switching apparatus.

5. For use in a phase locked loop frequency detector that includes phase detector, loop filter and tracking oscillator elements connected in a loop, the oscillator element providing an oscillator generated signal, an improved phase detector connected between the oscillator and filter and comprising phase sampling apparatus to repeatedly and quantitatively sample the phase difference between a data input signal applied to said apparatus and said oscillator generated signal, and current source and switching apparatus connected to pass loop filter input current during time intervals corresponding to said sample, said current switching apparatus including current switches connected to pass current in one direction with respect to the loop filter only during time intervals characterized in that the oscillator generated signal leads the data input signal, and to pass current in the opposite direction with respect to the loop filter only during time intervals characterized in that the data input signal leads the oscillator generated signal, said phase sampling apparatus including bi-stable devices each having dual states, one device connected to cause one of said current switches to pass current in said one direction when said device is in one of said states, another of said devices connected to cause another of said current switches to pass current in said opposite direction while said other device is in one of said states.

6. The combination of claim 5 in which said one device remains in said one state during said intervals of time in which the oscillator generated signal leads the data input signal and the other device remains in said one state during said intervals of time in which the data input signal leads the oscillator generated signal.

7. The combination of claim 5, in which each of said devices has another state in which it causes its associated current switch to cease passing current, and including means to place said devices in said other states at the ends of said intervals of time.

8. The phase detector of claim 2 wherein the average error current, as a function of phase difference between $\omega_i$ and $\omega_o$, is linear from $-\pi$ to $+\pi$ radians of phase error.

9. The phase detector of claim 8 wherein the error signal input to the filter has an average DC value of one polarity when $\omega_i$ initially exceeds $\omega_o$ and an average DC value of opposite polarity when $\omega_o$ initially exceeds $\omega_i$.

References Cited

UNITED STATES PATENTS

| | | | |
|---|---|---|---|
| 2,778,933 | 1/1957 | Crist | 329—50 |
| 2,899,643 | 8/1959 | Slonczewski | 329—122 X |
| 3,099,795 | 7/1963 | Frank | 329—122 X |
| 3,142,806 | 7/1964 | Fernandez | 329—122 X |

ALFRED L. BRODY, Primary Examiner

U.S. Cl. X.R.

325—346, 419; 328—133, 155; 329—122